(12) United States Patent
Hinkemeyer et al.

(10) Patent No.: US 8,261,328 B2
(45) Date of Patent: Sep. 4, 2012

(54) TRUSTED ELECTRONIC COMMUNICATION THROUGH SHARED VULNERABILITY

(75) Inventors: David Christopher Hinkemeyer, Clear Lake, MN (US); Daniel P Kolz, Rochester, MN (US); Taylor L Schreck, Rochester, MN (US); Garry J Sullivan, Rochester, MN (US); Rainieri Ventura, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 12/191,509

(22) Filed: Aug. 14, 2008

(65) Prior Publication Data

US 2010/0043059 A1 Feb. 18, 2010

(51) Int. Cl.
  *H04L 29/06* (2006.01)
(52) U.S. Cl. ............. 726/4; 726/3; 726/21; 726/22; 726/25
(58) Field of Classification Search .......... 726/3, 21, 726/22, 25, 4
  See application file for complete search history.

(56) References Cited

U.S. PATENT DOCUMENTS

| 2002/0099795 | A1* | 7/2002 | Betros et al. | 709/219 |
| 2007/0143851 | A1* | 6/2007 | Nicodemus et al. | 726/25 |
| 2008/0201780 | A1* | 8/2008 | Khan et al. | 726/25 |

OTHER PUBLICATIONS

NoScript, Retrieved from the Wayback Machine at http://web.archive.org/web/20070809092145/http://www.noscript.net/faq, Aug. 9, 2007, pp. 1-15.*

* cited by examiner

*Primary Examiner* — Haresh N Patel
*Assistant Examiner* — Chau Le
(74) *Attorney, Agent, or Firm* — Patterson & Sheridan LLP (57) ABSTRACT

A method for using shared vulnerability to provide trusted communication services between systems is disclosed. For example, a server may deny access to a service which renders it vulnerable to an untrusted client unless access to a useful vulnerability is received from the client. That is, the server may trust the client because any misuse by the client may result in the server exploiting the shared vulnerability. A system may request access to a service on another system to perform some transaction. Upon receiving this request, the server may determine a vulnerability of the client useful in deterring or stopping unwanted actions. The server may request access to this vulnerability. Once this vulnerability has been granted to the server, the server may then grant access to the requested service to the client.

21 Claims, 5 Drawing Sheets

TRUSTED ELECTRONIC COMMUNICATION THROUGH SHARED VULNERABILITY

BACKGROUND OF THE INVENTION

1. Field of the Invention

Embodiments of the invention generally relate to the field of electronic communication between computers. More specifically, embodiments of the invention relate to a method for trusted electronic communication through shared vulnerability.

2. Description of the Related Art

Computers and computer networks are increasingly used for conducting electronic commerce and other types of transactions. During these transactions, computers frequently request services from one another. As can be appreciated, when a computer system grants access to services or features to another system, it may leave itself susceptible to exploitation. Such exploitation can include crashing the system, hogging system resources to the exclusion of others, or performing other malicious or unwanted actions. In fact, such access may allow a malicious system to exploit vulnerabilities previously unknown or unavailable to the malicious system. In other words, malicious computers can exploit the access granted by a server.

In order to facilitate electronic commerce and other types of transactions, computers need to communicate with one another in a trusted manner. Especially in cases where the information is of a sensitive nature or where the communication provides access which makes the service provider vulnerable, it may be necessary for a service provider to avoid communicating with an untrusted computer, unless the untrusted computer can establish to the satisfaction of the service provider that the service provider can trust the untrusted computer. For example, if a server at a banking institution (the service provider) is providing access (critical access to its system) to a banking program at a user's computer (the untrusted system) by which banking transactions can be conducted, the server may demand to have some assurance that the untrusted system can be trusted to access the server in a manner that is agreeable to the bank.

SUMMARY OF THE INVENTION

One embodiment of the invention includes a computer-implemented method of providing a client application with access to a requested service provided by a server application. The method may generally include receiving, from the client application, a request for access to the service provided by the server application, and sending, to the client application, a request that the client application provide access to a vulnerability of a client system executing the client application as a condition to granting the client application the access to the service provided by the server application. The method may also include receiving, from the client application, access to the vulnerability of client system and granting the client application with access to the requested service provided by the server application.

Still another embodiment of the invention includes a computer-readable storage medium containing a program which, when executed, performs an operation for providing a client application with access to a requested service provided by a server application. The operation may generally include receiving, from the client application, a request for access to the service provided by the server application, and sending, to the client application, a request that the client application provide access to a vulnerability of a client system executing the client application as a condition to granting the client application the access to the service provided by the server application. The operation may further include receiving, from the client application, access to the vulnerability of client system and granting the client application with access to the requested service provided by the server application.

Still another embodiment of the invention includes a system having a processor and a memory containing a program, which, when executed by the processor, is configured to provide a client application with access to a requested service provided by a server application. The program may be generally configured to receive, from the client application, a request for access to the service provided by the server application, and send, to the client application, a request that the client application provide access to a vulnerability of a client system executing the client application as a condition to granting the client application the access to the service provided by the server application. The program may be further configured to receive, from the client application, access to the vulnerability of client system, and grant the client application with access to the requested service provided by the server application.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the inventions improve the ability for systems to provide trusted communication services by using a protocol for establishing a shared vulnerability. For example, a server may prohibit access to an FTP service if allowing access leaves the server vulnerable to an untrusted client unless the client provides the server access to a vulnerability of the client. That is, unless the client shares an exploitable vulnerability with the server. The shared vulnerability allows the server to deter the client from using the service access in a malicious or unwanted way. That is, the server may trust the client because any misuse by the client may result in the server exploiting the shared vulnerability. Thus, the shared vulnerability allows more systems to communicate with each other, thereby increasing productivity and efficiency of electronic transactions. In one embodiment, a system may request access to a service on a server system to perform some transaction. Upon receiving the request, the server may determine a vulnerability of the service requester or client that is useful in deterring or stopping malicious or unwanted actions. The server may then request access to this vulnerability of the client. In turn, the client may grant access to the shared vulnerability. Once access to the shared vulnerability has been granted and verified by the server, the server may grant the client access to the requested service.

Thereafter, the server may monitor how the client accesses the server for malicious or unwanted actions. Concurrently, the client may use the access and complete the transaction. However, if the server detects malicious or unwanted actions by the client then the server may exploit the vulnerability of the client and close the client's access to the server. If no malicious or unwanted actions occur, after the client completes the transaction, the client may signal to the server that the transaction is complete. The client may then close its vulnerability to the server. The server may close the connection between the client and the service when the client signals that the transaction is complete or when the client closes its vulnerability to the server.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
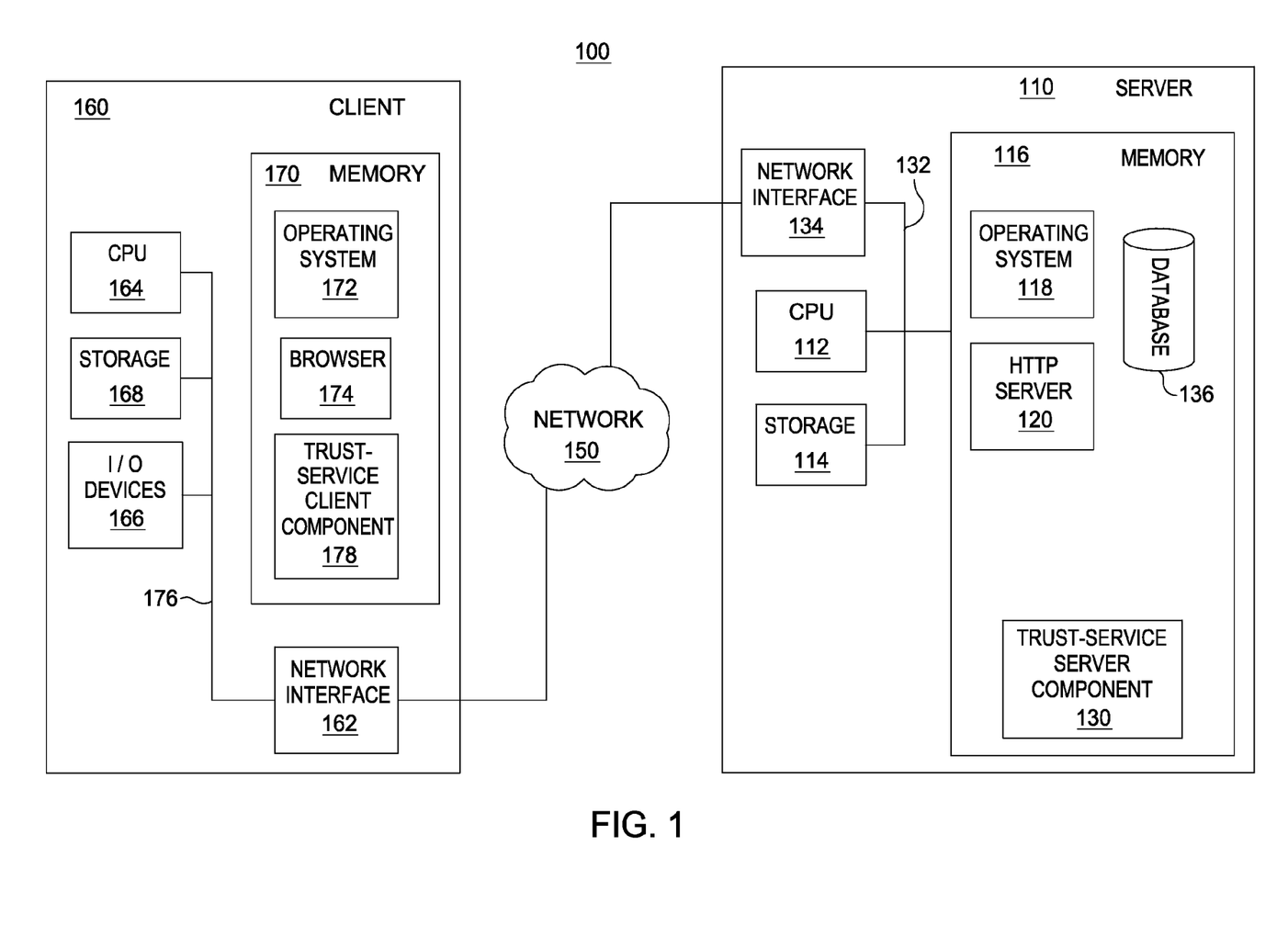
FIG. 1 is a block diagram illustrating an exemplary computing environment, according to one embodiment of the invention.

FIG. 1 is a block diagram illustrating an exemplary computing environment 100 in which embodiments of the present invention may be used. In general, the computing environment 100 includes a client (e.g. a user's) computer 160, and a server computer 110. The client computer 160 and the server computer 110 may be components of the same computer system or may be connected via a network 150, such as the Internet.

As shown, the client computer 160 includes a central processing unit (CPU) 164 connected to a memory 170, storage 168, and input device and output devices 166 via a bus 176. CPU 164 is included to be representative of a single CPU, multiple CPUs, a single CPU having multiple processing cores, and the like. Storage 168 stores application programs and data for use by computer system 160. Examples of storage 168 include one or more hard-disk drives, flash memory devices, optical media and the like. Client computer 160 may be connected to a data communications network 150 (e.g., a local area network, which itself may be connected to other networks such as the internet).

Memory 170 can be one or a combination of memory devices, including random access memory, nonvolatile or backup memory, (e.g., programmable or flash memories, read-only memories, etc.). Additionally, client computer 160 may include input/output devices 166 such as a mouse, keyboard and monitor, as well as a network interface 162 used to connect client computer 160 to network 115.

Illustratively, the memory 170 of client computer 160 stores an operating system 172 used to manage hardware and software executing on the client computer 160. As shown, memory 170 also includes a browser program 174 which, when executed by CPU 164, provides support for navigating between various servers and locating network addresses at one or more of servers (e.g., server computer 110).

Similar to client computer 160, the server computer 110 generally includes a CPU 112, a memory 116, a network interface device 134, and a storage device 114, coupled via a bus 132. Memory 116 is a random access memory sufficiently large to hold the necessary programming and data structures that are located on the server computer 110. As shown, memory 116 stores an operating system 118 used to manage server hardware and software executing on the server computer 110.

Illustratively, memory 116 also includes a hypertext transfer protocol (http) server process 120 configured to service requests from the client computer 160. For example, process 120 may respond to requests for access to electronic resources (e.g., databases, HTML documents, network information, and the like) residing on the server 110. However, one of ordinary skill in the art will recognize that the http server process 120 is merely illustrative and embodiments of the invention may be adapted to support other protocols. The programming and data structures of the http server process 120 may be executed by the CPU 112 as needed during operation. The server computer 110 may also include a network interface device 134 connecting server computer 110 to the network 150. (e.g., an analog modem, a wired network card, or a wireless network device).

In one embodiment, a request for access to an electronic resource (e.g., database access) received by the http server process 120 may require the server computer 110 to request and receive access to a vulnerability from the client computer 160 before granting access to the requested electronic resource. This may occur, e.g., when granting access would make the server vulnerable to malicious or unwanted actions from the client computer 169. For example, a user may visit a website which allows the user, if trusted and authenticated, to log in and perform banking transactions by accessing and modifying financial records in a database on the server.

As one of ordinarily skill in the art will appreciate, authentication may occur by various known and unknown protocols. For example, a user may provide a name and password to the banking website transmitted using the SSL standard. It should also be appreciated that providing trusted communications may be a part of the authentication procedure or handled separately. Further, embodiments of the invention and, in general, communication between the systems may be encrypted or protected through additional security means.

In one embodiment, a trust-service client component 178 or client component 178 of the client computer 160 may communicate with a trust-service server component 130 or server component 130 of the server computer 110 to provide trusted communication during a transaction. The interaction between the client component 178 and server component 130 are described in conjunction with a discussion of FIG. 2.

Figure 2:
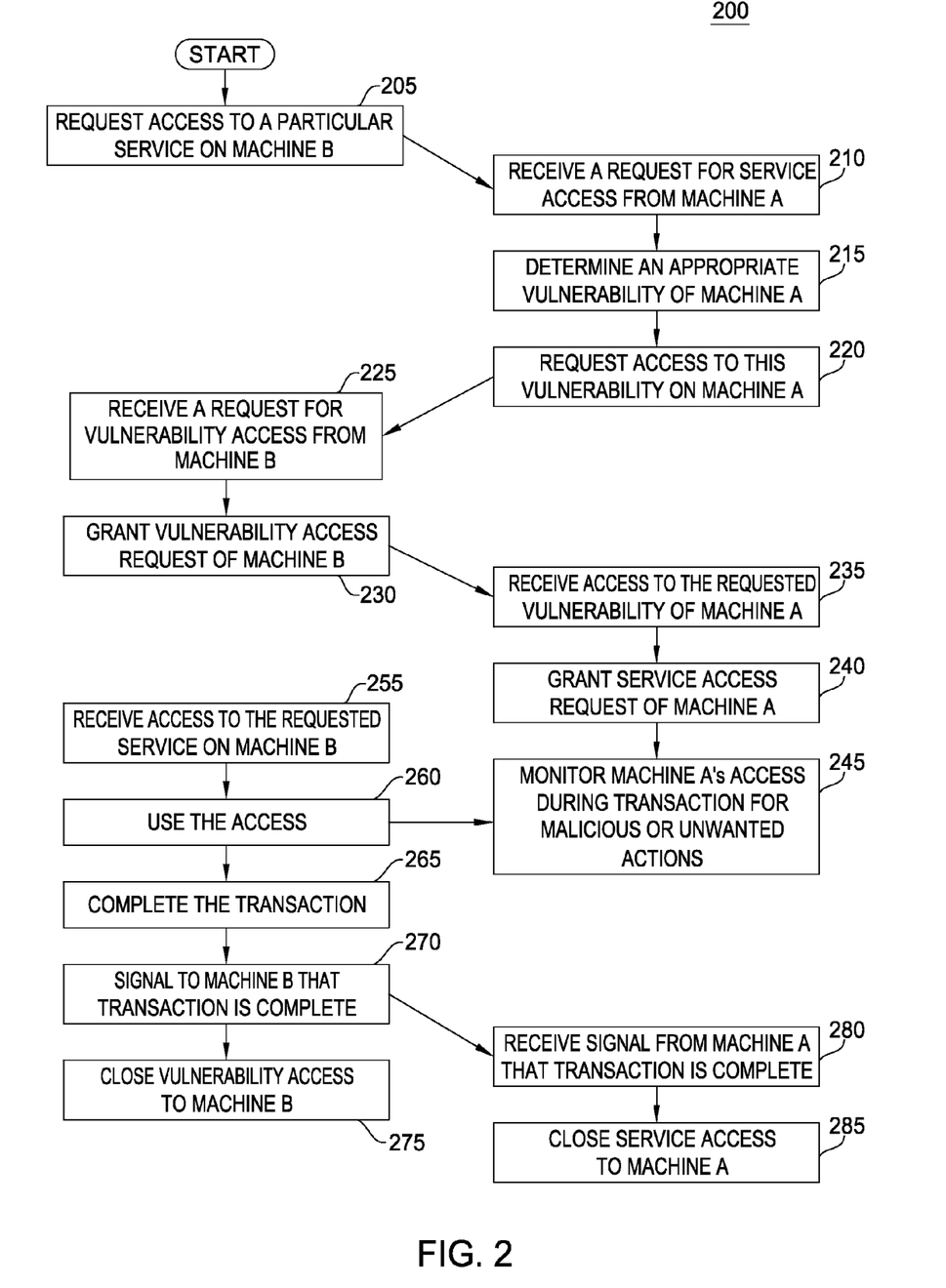
FIG. 2 is a flowchart illustrating a method for providing trusted electronic communication through a shared vulnerability, according to one embodiment of the invention.

FIG. 2 is a flowchart illustrating a method 200 for providing trusted electronic communication through a shared vulnerability, according to one embodiment of the invention. As shown, the method 200 begins at step 205, where the client component 178, or other software component, may request access to a particular service (i.e. a database service, an FTP service, etc.) on the server. In one embodiment, the service request may contain information about the client useful to the server for communication purposes. For example, the service request may include identification information, service usage information, and operating system information. Thus, the service request may be used as a basis for determining where trusted communication is necessary and whether the prospective client may be trusted. Service requests are further described below with reference to FIG. 4. At step 210, the server component 130, may receive the service request from the client.

At step 215, the server component 130 may determine whether to require access to a shared vulnerability from the client in order to grant access to the requested service and, if so, determine an appropriate vulnerability to request from the client. For example, a request for a web page may be granted without requiring access to a shared vulnerability in return because such access does not leave the server vulnerable. In contrast, a request for read-write access to a database on the server may require access to a shared vulnerability because of the potential for a client to misuse such access. In one embodiment, the server component 130 may be configured to use information received in the service request in making the determination. Further, in one embodiment, the server component 130 may be configured to request additional information from the client to make the determination. Further still, in one embodiment, the server component 130 may be configured to notify the user of the request for access to the shared vulnerability and prompt for an appropriate set of user input required for the server to have access to the shared vulnerability. Alternatively, in one embodiment, the server component 130, or other software component, may be configured to determine whether to grant access based on preconfigured information or programmatically. Additionally, in one embodiment, the server component 130 may be configured to deny a service request if an appropriate shared vulnerability cannot be determined.

At step 220, the server component 130 may request access to the shared vulnerability determined at step 215. At step 225, the client component 178 may receive the vulnerability request from the server. In one embodiment, the client component 178 may determine whether to grant access to the requested vulnerability. Further, the client component 178 may notify the user of the vulnerability request and prompt for any necessary user input. Alternatively, the client component 178 may determine whether to grant access based on information included in the service request received at step 205. At step 230, the client component 178 may grant access to the shared vulnerability to the server.

At step 235, the server component 130 may receive access to the shared vulnerability provided by the client component 178. In one embodiment, the server component 130 may verify the vulnerability of the client and the server's access to the vulnerability before granting the service request. At step 240, the server component 130 may grant access to the service requested by the client. At step 245, the server component 130 may monitor the client accessing the requested service for malicious or unwanted actions. Actions relating to step 245 are further described below with reference to FIG. 3.

At step 255, the client component 178, may receive access to the requested service. At step 260, the client may use the access to perform a transaction. At step 265, the client may complete the transaction. At step 270, upon completing the transaction, the client component 178 may transmit a signal to the server that the transaction is complete. At step 275, the client component 178 may close access to the shared vulnerability.

At step 280, the server component 130 may receive the transaction completion signal from the client component 178. At step 285, the server component 130 may be configured to close the access to the service previously granted to the client. In one embodiment, the server component 130 may lose the service access to the client when the server receives the signal that the transaction is complete or when the client closes the vulnerability access to the server.

Figure 3:
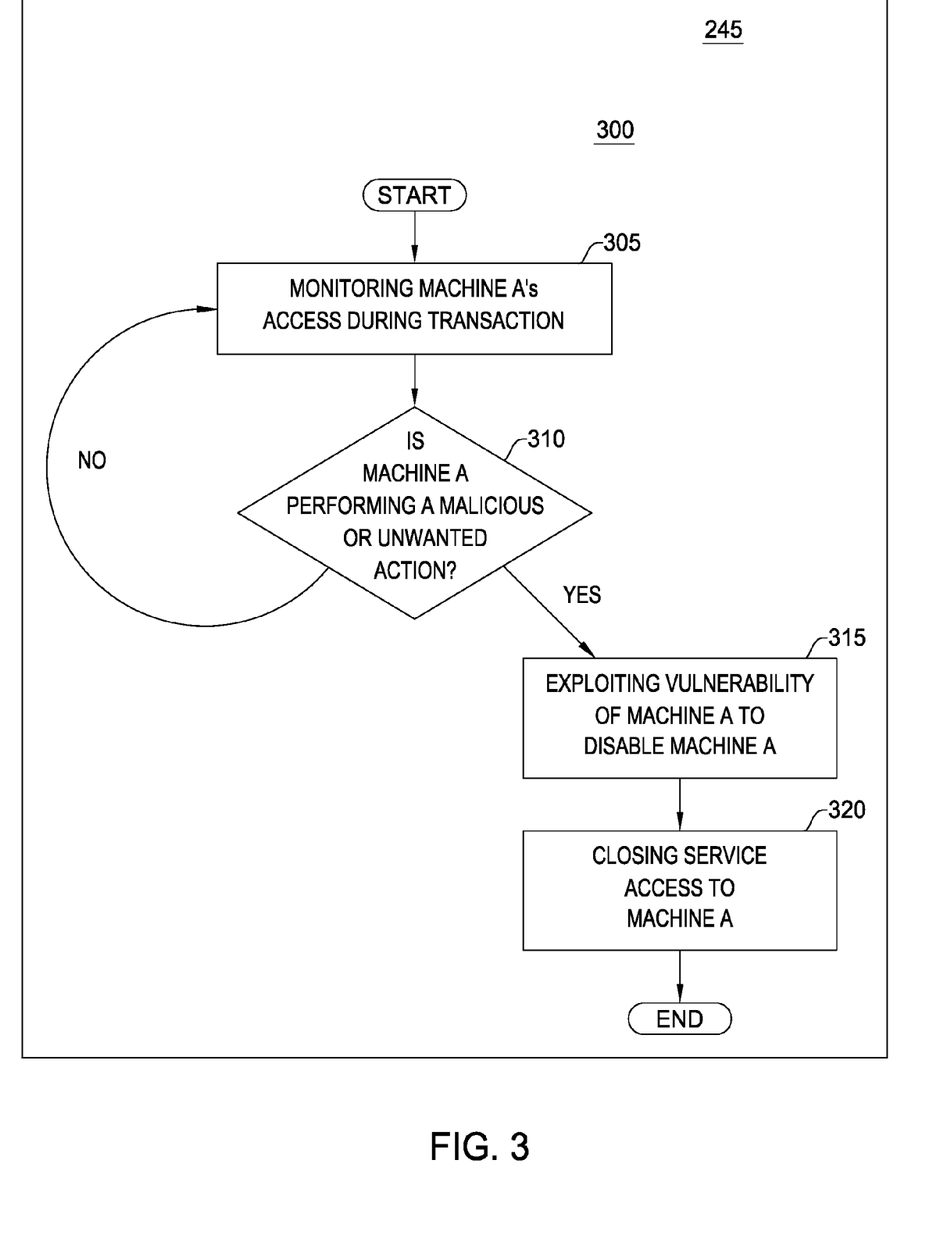
FIG. 3 is a flowchart illustrating a method for monitoring service access for malicious or unwanted actions, according to one embodiment of the invention.

FIG. 3 is a flowchart illustrating a method 300 for monitoring service access for malicious or unwanted actions, according to one embodiment of the invention. As shown, the method 300 further illustrates step 245 of FIG. 2. The method 300 begins at step 305, where the server component 130 may monitor the client's access to the requested service on the server. At step 310, the server component 130 may determine whether the client is performing or attempting to perform a malicious or unwanted action while accessing the requested service. For example, the client may attempt to crash the server by using file write access to flood the hard drive of the server. Another possibility includes the client attempting to access data or services that are not part of the original access requested (e.g., the client is granted access to one database table but tries to read another database table) or to exploit the given access differently than it originally allowed (e.g., instead of just reading data, also trying to write data). Still another unwanted action includes an inappropriately high volume of network packets using the given access (commonly referred to as packet flooding). In such a case, the server may determine that the access attempt is not actually legitimate but is really a denial-of-service attack.

If the server component determines that the client engages in a malicious or unwanted action, then at step 315, the server component 130 may exploit the shared vulnerability provided by the client to disable the client from misusing access to the requested service. For example, the server component 130 might exploit a shared vulnerability that allows the server component 130 to shutdown or reboot the client. Of course, one of ordinarily skill in the art, will recognize that a shared vulnerability may take many forms and cause various impairments to limit or close a client's access to the requested service. At step 320, the server component 130, or other software component, may be configured to close the client's access to the service.

Figure 4:
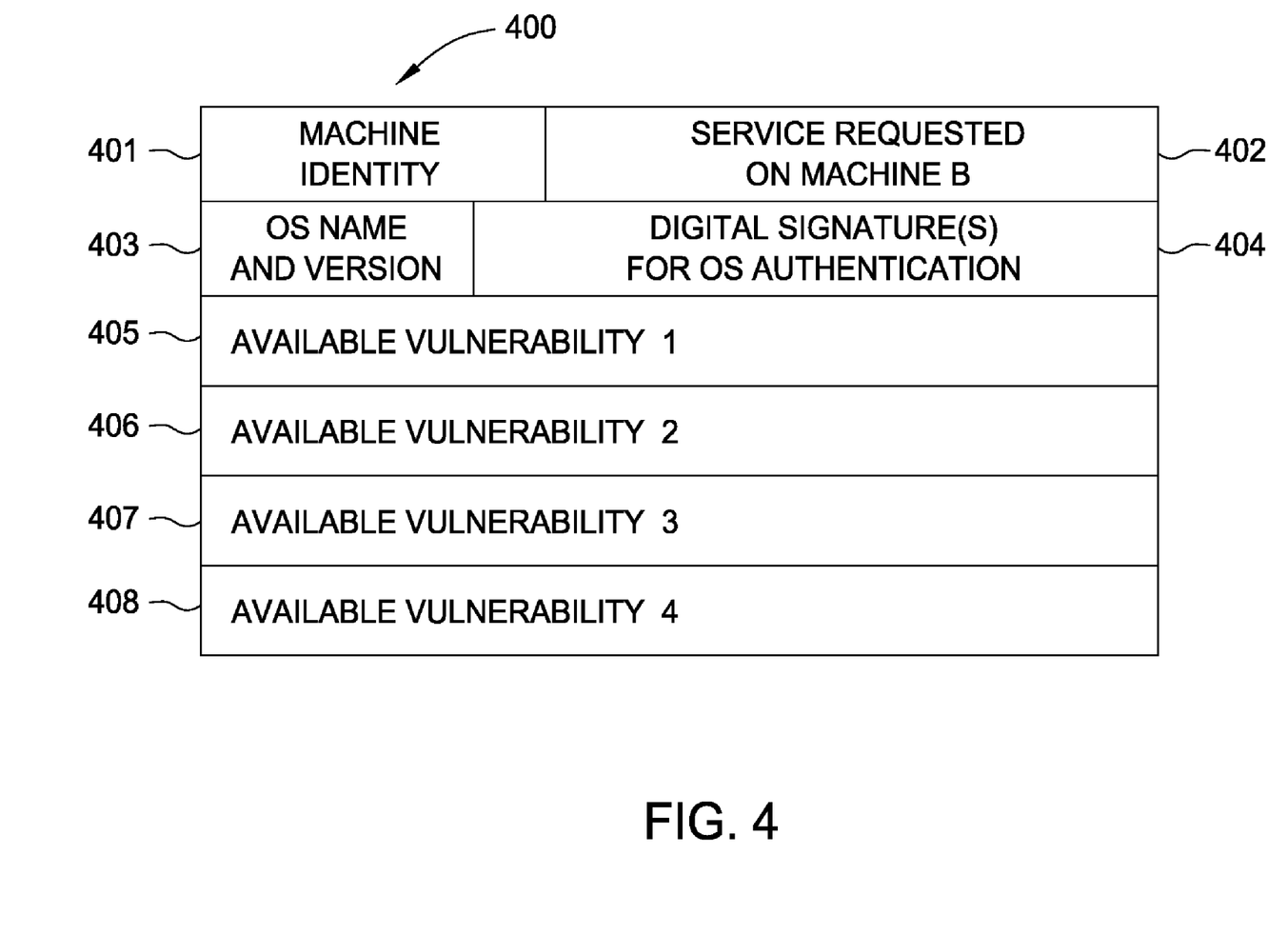
FIG. 4 illustrates an example service request sent by a client, according to one embodiment of the invention.

As mentioned above, the client component 178 may send a service request to a server. FIG. 4 illustrates an example of a service request 400 sent by a client, according to one embodiment of the invention. As shown, the service request 400 includes information indicating a machine identity 401, a service access field 402, an operating system (OS) name 403, an OS authentication 404, and available OS vulnerabilities 405-408. Of course, embodiments of the invention are not limited to vulnerabilities provided by the operating system. For example, the client process requesting access to the service could provide a vulnerability allowing the server to shut down the requesting service remotely. Providing the server with access to this vulnerability effectively allows the server to respond to unwanted or malicious actions by terminating the offending process on the client.

Illustratively, the machine identity 401 portion contains information to identify the computer to the server. For example, machine identity 401 may contain an internet protocol (IP) address and a digital certificate issue by a certification authority. Of course, one of ordinary skill in the art will recognize that the use of an IP number and a digital certificate is merely illustrative and embodiments of the invention may be adapted to support both other methods of identification.

The service access 402 indicates the particular service which the client is requesting access to. As shown, this field is labeled "service requested" on machine B" in a service access field 402. The OS name and version 403 or OS name 403 indicate the operating system running on the client computer system. In addition, the service request 400 includes OS authentication 404 which allows the server to verify that the client is indeed running the OS identified in OS name 403. Illustratively, the OS authentication field is labeled digital signatures for OS authentication 404. For example, in one embodiment, the OS authentication may provide through digital signatures, hash values, or other cryptographic techniques used to verify the assertion that the client is running a particular OS.

As shown, the service request 400 contains a list of available vulnerabilities 405-408 which indicate possible vulnerabilities the server may be given access to in exchange for the access to a particular requested service 402 requested. For example, the client may be an operation with a known remote-shutdown vulnerability. Therefore, available vulnerability 1 405 indicates that the remote shutdown vulnerability is available. Illustratively, the service request 400 contains four vulnerabilities for the server to request. However, one of ordinary skill in the art will recognize the number and type of vulnerabilities may be dependent on the OS the client is running and on the client's discretion. Additionally, one of ordinary skill in the art will recognize that the listing of vulnerabilities in the service request 400 is merely illustrative and embodiments of the invention may be adapted to support both other methods of vulnerability delivery.

Figure 5:
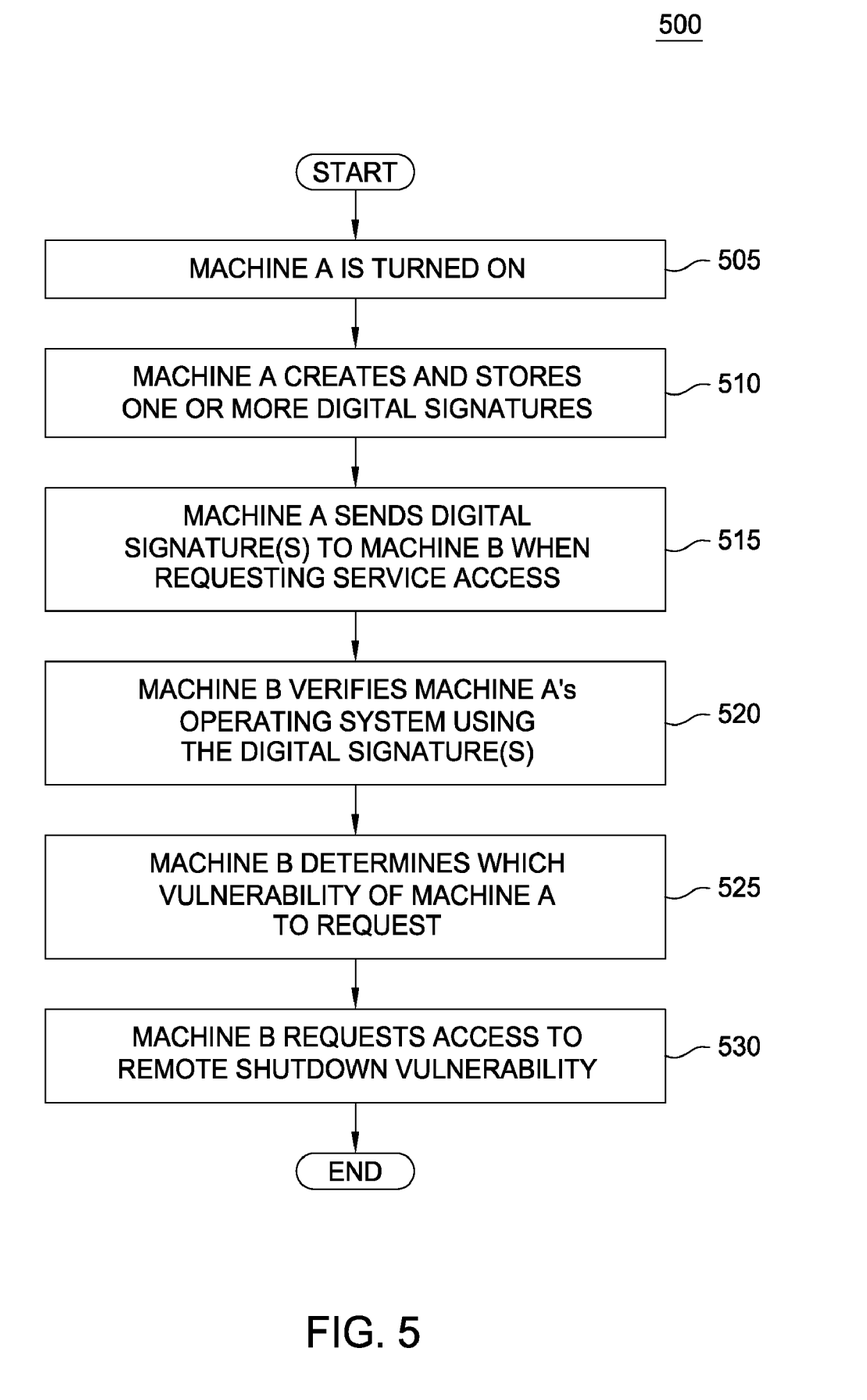
FIG. 5 is a flowchart illustrating a method for delivering and receiving vulnerability information, according to one embodiment of the invention.

FIG. 5 is a flowchart illustrating a method 500 for a client to deliver shared vulnerability information to a server, according to one embodiment of the invention. As described above, the server may determine which shared vulnerability to request access to, based on the client's operating system. More specifically, method 500 illustrates a method of providing operating system authentication information to the server, in addition to vulnerability information.

At step 505, the client may be turned on. At step 510, the client may generate one or more digital signatures. In one embodiment, the digital signatures may be generated at different stages of the system startup process. For example, one digital signature may be created and stored after the initial hardware is loaded and a basic input/output system is loaded. Another digital signature may be created and stored after the operating system has loaded. One of ordinary skill in the art will recognize the number and type of digital signatures may be dependent on the security protocol employed. Furthermore, one of ordinary skill in the art will recognize embodiments of the invention may be adapted to support both known and unknown protocols.

At step 515, the client may send the one or more digital signatures to the server. In one embodiment, the client may include the one or more digital signatures with the initial service request 400 and OS authentication data 404. Alternatively, the client may send the one or more digital signatures to the server in a separate exchange. At step 520, the server verifies the assertion made by the client that it is running a particular operating system (or version thereof) using the digital signatures sent to the server.

At step 525, the server may determine which shared vulnerability of the client to request access to. As discussed above, the server may select a shared vulnerability based on a variety of criteria. Further, the shared vulnerabilities available from the client may themselves be diverse and may depend on numerous factors. Illustratively, in one embodiment, the server may request access to a remote-shutdown vulnerability, allowing the server to force the client computer to shutdown if access granted to a particular server is misused.

Advantageously, embodiments of the invention provide a protocol allowing two computers to trust one another using a shared vulnerability. In order for a first system to be granted access to a second system, the first system opens a shared vulnerability to the second system such that the second system may take retributive action if the first system initiates a hostile (or simply unwanted) action of some kind. That is, the server may trust the client because any misuse by the client may result in the server exploiting the shared vulnerability. Once the transaction is complete, the first system may close the vulnerability.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing a client application with access to a requested service provided by a server application, comprising:

receiving, from the client application, a request for access to the service provided by the server application, wherein the client application executes on a client system having a vulnerability;

sending, to the client application, a request that the client application provide access to the vulnerability as a condition to granting the client application the access to the service provided by the server application;

receiving, from the client application, access to the vulnerability;

granting the client application with access to the requested service provided by the server application;

monitoring, by the server application, the client application accessing the requested service; and upon determining the client system has performed an unwanted action, by the server application, exploiting the vulnerability to prevent the client system from further performing the unwanted action.

2. The method of claim 1, wherein the request for access to the service provided by the server application comprises:

information identifying the client system;

information identifying an operating system running on the client system;

information allowing the service provider to verify the operating system running on the client system; and information identifying at least one available vulnerability to which the server application can request the client application share access.

3. The method of claim 1, further comprising:

initiating, by the server application, a transaction requested by the client application; and receiving a signal that the transaction is complete, wherein the client application is configured to close access to the vulnerability upon completion of the transaction.

4. The method of claim 1, further comprising:

after granting the client application with access to the requested service, determining that the client application has closed access to the vulnerability; and terminating access to the requested service.

5. The method of claim 1, wherein the request for access to the service includes information identifying a plurality of shared vulnerabilities which the server application can request the client application share access to, and further comprising:

selecting one of the plurality of vulnerabilities; and requesting access to the selected vulnerability.

6. The method of claim 1, further comprising:

monitoring the client system accessing the requested service; and upon determining the client system has performed an unwanted action, exploiting the vulnerability to prevent the client system from further performing the unwanted action.

7. The method of claim 1, further comprising, verifying that the client application has access to the vulnerability before granting the request for access to the service provided by the server application.

8. A computer program product for providing a client application with access to a requested service provided by a server application, comprising:

a computer-readable storage device having computer-readable program code embodied therewith, the computer-readable program code comprising:

computer-readable program code configured to receive, from the first client application, a request for access to the service provided by the server application, wherein the client application executes on a client system having a vulnerability;

computer-readable program code configured to send, to the client application, a request that the client application provide access to the vulnerability as a condition to granting the client application the access to the service provided by the server application;

computer-readable program code configured to receive, from the client application, access to the vulnerability;

computer-readable program code configured to grant the client application access to the requested service provided by the server application;

computer-readable program code configured to monitor the client system accessing the requested service, the monitoring is by the server application; and upon determining the client system has performed an unwanted action, computer-readable program code configured to exploit the vulnerability to prevent the client from further performing the unwanted action, the exploiting is by the server application.

9. The computer program product of claim 8, wherein the request for access to the service provided by the server application comprises:

information identifying the client system;

information identifying an operating system running on the client system;

information allowing the service provider to verify the operating system running on the client system; and information identifying at least one available vulnerability to which the server application can request the client application share access.

10. The computer program product of claim 8, wherein the operation further comprises:

initiating, by the server application, a transaction requested by the client application; and receiving a signal that the transaction is complete, wherein the client application is configured to close access to the vulnerability upon completion of the transaction.

11. The computer program product of claim 8, wherein the operation further comprises:

after granting the client application with access to the requested service, determining that the client application has closed access to the vulnerability; and terminating access to the requested service.

12. The computer program product of claim 8, wherein the request for access to the service includes information identifying a plurality of shared vulnerabilities which the server application can request the client application share access to, and wherein the operation further comprises:

selecting one of the plurality of vulnerabilities; and requesting access to the selected vulnerability.

13. The computer program product of claim 8, wherein the operation further comprises:

monitoring the client system accessing the requested service; and upon determining the client system has performed an unwanted action, exploiting the vulnerability to prevent the client system from further performing the unwanted action.

14. The computer program product of claim 8, wherein the operation further comprises, verifying that the first client application has access to the vulnerability before granting the request for access to the service provided by the server application.

15. A system, comprising:

a processor; and a memory containing a program, which, when executed by the processor, is configured to provide a client application with access to a requested service provided by a server application by performing the steps of:

receiving, from the client application, a request for access to the service provided by the server application, wherein the client application executes on a client system having a vulnerability;

sending, to the client application, a request that the client application provide access to the vulnerability as a condition to granting the client application the access to the service provided by the server application;

receiving, from the client application, access to the vulnerability;

granting the client application access to the requested service provided by the server application;

monitoring, by the server application, the client system accessing the requested service; and upon determining the client system has performed an unwanted action, by the server application, exploiting the vulnerability to prevent the client system from further performing the unwanted action.

16. The system of claim 15, wherein the request for access to the service provided by the server application comprises:
  information identifying the client system;
  information identifying an operating system running on the client system;
  information allowing the service provider to verify the operating system running on the client system; and
  information identifying at least one available vulnerability to which the server application can request the client application share access.

17. The system of claim 15, wherein the steps further comprise:
  initiating, by the server application, a transaction requested by the client application; and
  receiving a signal that the transaction is complete, wherein the client application is configured to close access to the vulnerability upon completion of the transaction.

18. The system of claim 15, wherein the steps further comprise:
  after granting the client application with access to the requested service, determining that the client application has closed access to the vulnerability; and
  terminating access to the requested service.

19. The system of claim 15, wherein the request for access to the service includes information identifying a plurality of shared vulnerabilities which the server application can request the client application share access to, wherein the steps further comprise:
  selecting one of the plurality of vulnerabilities; and
  requesting access to the selected vulnerability.

20. The system of claim 15, wherein the steps further comprise:
  monitoring the client system accessing the requested service; and
  upon determining the client system has performed an unwanted action, exploiting the vulnerability to prevent the client system from further performing the unwanted action.

21. The system of claim 15, wherein the steps further comprise, verifying that the client application has access to the vulnerability before granting the request for access to the service provided by the server application.

* * * * *